US012589529B2

(12) United States Patent
Fujisawa

(10) Patent No.: US 12,589,529 B2
(45) Date of Patent: Mar. 31, 2026

(54) RESIN SEALING APPARATUS

(71) Applicant: Yamaha Robotics Co., Ltd., Tokyo (JP)

(72) Inventor: Masahiko Fujisawa, Nagano (JP)

(73) Assignee: Yamaha Robotics Co., Ltd., Tokyo (JP)

( * ) Notice: Subject to any disclaimer, the term of this patent is extended or adjusted under 35 U.S.C. 154(b) by 320 days.

(21) Appl. No.: 18/181,553

(22) Filed: Mar. 10, 2023

(65) Prior Publication Data

US 2023/0382022 A1 Nov. 30, 2023

(30) Foreign Application Priority Data

May 31, 2022 (JP) ................................. 2022-088841

(51) Int. Cl.
| | |
|---|---|
| *B29C 43/32* | (2006.01) |
| *B29C 33/30* | (2006.01) |
| *B29C 43/18* | (2006.01) |
| *B29C 43/36* | (2006.01) |
| *B29C 45/14* | (2006.01) |
| *B29C 45/26* | (2006.01) |

(Continued)

(52) U.S. Cl.
CPC ............ *B29C 43/32* (2013.01); *B29C 33/305* (2013.01); *B29C 43/18* (2013.01); *B29C 43/36* (2013.01); *B29C 45/14* (2013.01); *B29C 45/2602* (2013.01); *B30B 15/007* (2013.01); *B30B 15/06* (2013.01); *B29L 2031/34* (2013.01)

(58) Field of Classification Search
CPC .................................................... B30B 15/007
See application file for complete search history.

(56) References Cited

U.S. PATENT DOCUMENTS

| | | | | |
|---|---|---|---|---|
| 5,179,879 A | * | 1/1993 | Yerly | ...................... B30B 15/14 |
| | | | | 100/258 R |
| 5,776,402 A | * | 7/1998 | Glaesener | ........... B29C 45/1744 |
| | | | | 264/328.9 |

(Continued)

FOREIGN PATENT DOCUMENTS

| | | |
|---|---|---|
| CN | 208392494 | 1/2019 |
| CN | 109382985 | 2/2019 |

(Continued)

OTHER PUBLICATIONS

"First Office Action Notification of China Counterpart Application", with English translation thereof, issued on Nov. 24, 2025, pp. 1-14.

*Primary Examiner* — Benjamin A Schiffman
(74) *Attorney, Agent, or Firm* — JCIPRNET

(57) ABSTRACT

The resin sealing apparatus according to the present invention includes a press device for closing and opening an upper mold and a lower mold. The press device includes a fixed platen to which one of the upper mold and the lower mold is fixed and a movable platen to which the other one is fixed, a tie bar fixing the fixed platen and holding the movable platen so that the movable platen can be lifted and lowered, and a drive device lifting and lowering the movable platen. The fixed platen has a fixed portion fixed to the tie bar on the side of a first surface of a main body portion and a bell-shaped portion provided on the side of a second surface opposite to the first surface, and one of the upper mold and the lower mold is fixed to the bell-shaped portion.

8 Claims, 4 Drawing Sheets

(51) Int. Cl.
　　*B30B 15/00*　　　　(2006.01)
　　*B30B 15/06*　　　　(2006.01)
　　B29L 31/34　　　　(2006.01)

(56)　　　　　　　References Cited

U.S. PATENT DOCUMENTS

| | | | | |
|---|---|---|---|---|
| 6,027,329 | A * | 2/2000 | Nazarian | B29C 45/1744 |
| | | | | 425/589 |
| 7,318,721 | B2 * | 1/2008 | Spicer | B29C 45/1744 |
| | | | | 100/295 |
| 7,491,051 | B2 * | 2/2009 | Matsushita | B29C 45/1744 |
| | | | | 264/328.9 |
| 7,857,612 | B2 * | 12/2010 | Teng | B22D 17/26 |
| | | | | 425/595 |
| 9,314,950 | B2 * | 4/2016 | Senga | B29C 45/1744 |
| 9,566,732 | B2 * | 2/2017 | Shioiri | B29C 45/1744 |
| 9,738,020 | B2 * | 8/2017 | Murata | B29C 45/1744 |
| 10,710,290 | B2 * | 7/2020 | Kato | B22D 17/22 |
| 2008/0173190 | A1 * | 7/2008 | Teng | B30B 15/007 |
| | | | | 100/295 |
| 2021/0187803 | A1 * | 6/2021 | van Driel | B30B 15/06 |

FOREIGN PATENT DOCUMENTS

| | | | | |
|---|---|---|---|---|
| CN | 112309898 | | 2/2021 | |
| EP | 3434441 | B1 * | 9/2021 | B22D 17/26 |
| JP | 2004042356 | | 2/2004 | |
| JP | 2008093987 | | 4/2008 | |
| JP | 2009148933 | | 7/2009 | |
| JP | 2015150693 | | 8/2015 | |
| JP | 2019077106 | | 5/2019 | |
| JP | 2024074323 | A * | 5/2024 | |

* cited by examiner

RESIN SEALING APPARATUS

CROSS-REFERENCE TO RELATED APPLICATION

This application claims the priority benefits of Japanese application no. 2022-088841, filed on May 31, 2022. The entirety of the above-mentioned patent application is hereby incorporated by reference herein and made a part of this specification.

BACKGROUND OF THE INVENTION

Field of the Invention

The present invention relates to a resin sealing apparatus.

Description of Related Art

Apparatuses using a transfer molding method and a compression molding method are known as examples of a resin sealing apparatus that seals a workpiece having electronic components mounted on a base material with sealing resin (may be simply referred to as "resin" hereinafter) and processes it into a molded product.

The transfer molding method is a technique of providing a pot to supply a predetermined amount of resin to two sealing regions (cavities) of upper and lower molds provided in a sealing mold that is composed of the upper mold and the lower mold, respectively placing a workpiece at a position corresponding to each sealing region, and sealing resin by an operation of clamping with the upper mold and the lower mold and pouring resin from the pot into the cavities. Further, the compression molding method is a technique of supplying a predetermined amount of resin to the sealing region (cavity) provided in a sealing mold that is composed of an upper mold and a lower mold and placing a workpiece in the sealing region, and sealing resin by an operation of clamping with the upper mold and the lower mold. As an example, when a sealing mold having a cavity in the upper mold is used, there is a technique of supplying resin to the central position on a workpiece collectively for molding. On the other hand, when a sealing mold having a cavity in the lower mold is used, there is a technique of supplying a film covering the mold surface including the cavity and resin for molding.

In either method, a press device exemplified in Patent Document 1 (Japanese Patent Laid-Open No. 2008-093987), that is, a mechanism for closing (clamping) the sealing mold (upper mold and lower mold) to seal the workpiece with resin, is provided.

BRIEF SUMMARY OF THE INVENTION

Here, the sealing mold is generally fixed to a pair of movable and fixed platens, and the movable platen is driven (pushed) toward the fixed platen by a drive device, so that a mold closing force (pressurizing force) is applied to the sealing mold. However, since an extremely large force is applied as the pressurizing force, there is a problem that the fixed platen may be deformed, and in particular, the flatness of the mold fixing surface to which the sealing mold (upper mold or lower mold) is fixed may decrease (deteriorate). That is, when the flatness of the mold fixing surface decreases (deteriorates), the fixed sealing mold is deformed (bent), which causes molding defects (specifically, a state in which the molded product does not have the dimensions and shape as designed), and therefore, a solution has been desired (Patent Document 2: Japanese Patent Laid-Open No. 2004-042356, Patent Document 3: Japanese Patent Laid-Open No. 2009-148933, etc.).

In order to solve the above problem, the inventors of the present application have conducted intensive research and first devised a configuration (comparative example) with regard to the fixed platen of the press device, which secures rigidity by particularly increasing the thickness at the central position in the radial direction (that is, the thickness dimension in the mold closing direction (up-down direction)) in proportion to the enhancement of the mold closing force (clamping force), that is, the pressurizing force applied to the sealing mold, so as to suppress deformation of the mold fixing surface (not shown). However, in recent years, with the increase in the sizes of the products (molded products formed by resin sealing) and the increase in the devices (products embedded in molded products) that require improved filling properties, etc., there is an increasing demand for an apparatus that can apply a larger mold closing force (clamping force). As a result, another problem arises, which is the fact that the fixed platen becomes very thick and heavy. Thus, the prevention of deformation of the mold fixing surface of the fixed platen and the reduction of the unit weight of the fixed platen have been contradictory problems.

The present invention realizes a resin sealing apparatus that is capable of preventing a decrease in flatness of the mold fixing surface at the time of mold closing in the fixed platen of the press device and achieving weight reduction.

A resin sealing apparatus according to the present invention is provided for sealing a workpiece with resin and processing the workpiece into a molded product using a sealing mold which includes an upper mold and a lower mold. The resin sealing apparatus includes: a press device closing and opening the upper mold and the lower mold. The press device includes a fixed platen to which one of the upper mold and the lower mold is fixed and a movable platen to which the other one of the upper mold and the lower mold is fixed, a tie bar fixing the fixed platen and holding the movable platen so that the movable platen is able to be lifted and lowered, and a drive device lifting and lowering the movable platen. The fixed platen is provided with a fixed portion fixed to the tie bar on a first surface side of a main body portion and is provided with a bell-shaped portion on a second surface side opposite to a first surface, and one of the upper mold and the lower mold is fixed to the bell-shaped portion.

According to this, regarding the fixed platen constituting the press device, it is possible to prevent the flatness of the mold fixing surface from decreasing when a mold closing force is applied, and to simultaneously achieve a reduction in size and weight. As an example, the amount of deformation (the amount of bending with respect to a flat surface) can be suppressed to ½ or less compared to the above-mentioned comparative example, and the dimension in the up-down direction can be reduced by about 50% and the weight can be reduced by about 30%.

Further, a circumferential recessed portion, bored toward a center in a radial direction, may be provided between the main body portion and the bell-shaped portion. According to this, the effect of maintaining the balance between the amount of deformation near the center in the radial direction and the amount of deformation near the outer periphery in the radial direction in the bell-shaped portion, that is, preventing a difference in the amount of deformation from occurring, can be obtained. Thus, it is possible to obtain the effect of keeping the mold fixing surface flat (that is, the effect of preventing the flatness of the mold fixing surface from decreasing (deteriorating)).

In addition, the recessed portion may be formed so that an innermost portion in the radial direction is located closer to the center in the radial direction than an outer peripheral portion of one of the upper mold and the lower mold in both a left-right direction and a front-rear direction. According to this, the effect of keeping the mold fixing surface flat (that is, the effect of preventing the flatness of the mold fixing surface from decreasing (deteriorating)) can be further enhanced.

Further, the fixed portion may be provided at a tip portion of an arm portion extended radially at four corners of the main body portion, and the arm portion may be configured as a bending generating portion that generates relatively greater bending than other portions by setting stress to be concentrated during mold closing. According to this, deformation of the bell-shaped portion, particularly, the mold fixing surface, can be prevented by positively deforming (bending) the arm portion when a mold closing force is applied. Deformation of the mold fixing surface can be suppressed without using the conventional rigidity enhancement technique of increasing the thickness of the fixed platen at the central position in the radial direction.

Further, the main body portion and the bell-shaped portion may be integrally formed by casting, and may be provided with a central hole, bored in a direction from the first surface toward a second surface, at a central position in the radial direction, and the central hole may be formed with an inner diameter decreasing stepwise or tapered in a direction from the first surface toward the second surface. According to this, the mold closing force acting on the bell-shaped portion via one mold that is fixed can be directed toward the arm portion. That is, the stress can be concentrated on the arm portion. In addition, the weight of the fixed platen can be reduced. Furthermore, integral formation by casting becomes possible, and production efficiency can be improved and production costs can be reduced.

Moreover, the central hole may be formed so as not to penetrate to a mold fixing surface of the bell-shaped portion. According to this, the effect of keeping the mold fixing surface flat, that is, the effect of preventing the flatness of the mold fixing surface from decreasing (deteriorating), can be further enhanced.

According to the present invention, it is possible to solve the contradictory problems of preventing deformation of the mold fixing surface of the fixed platen and reducing the unit weight of the fixed platen.

DETAIL DESCRIPTION OF THE INVENTION

Overall Configuration

Figure 1:
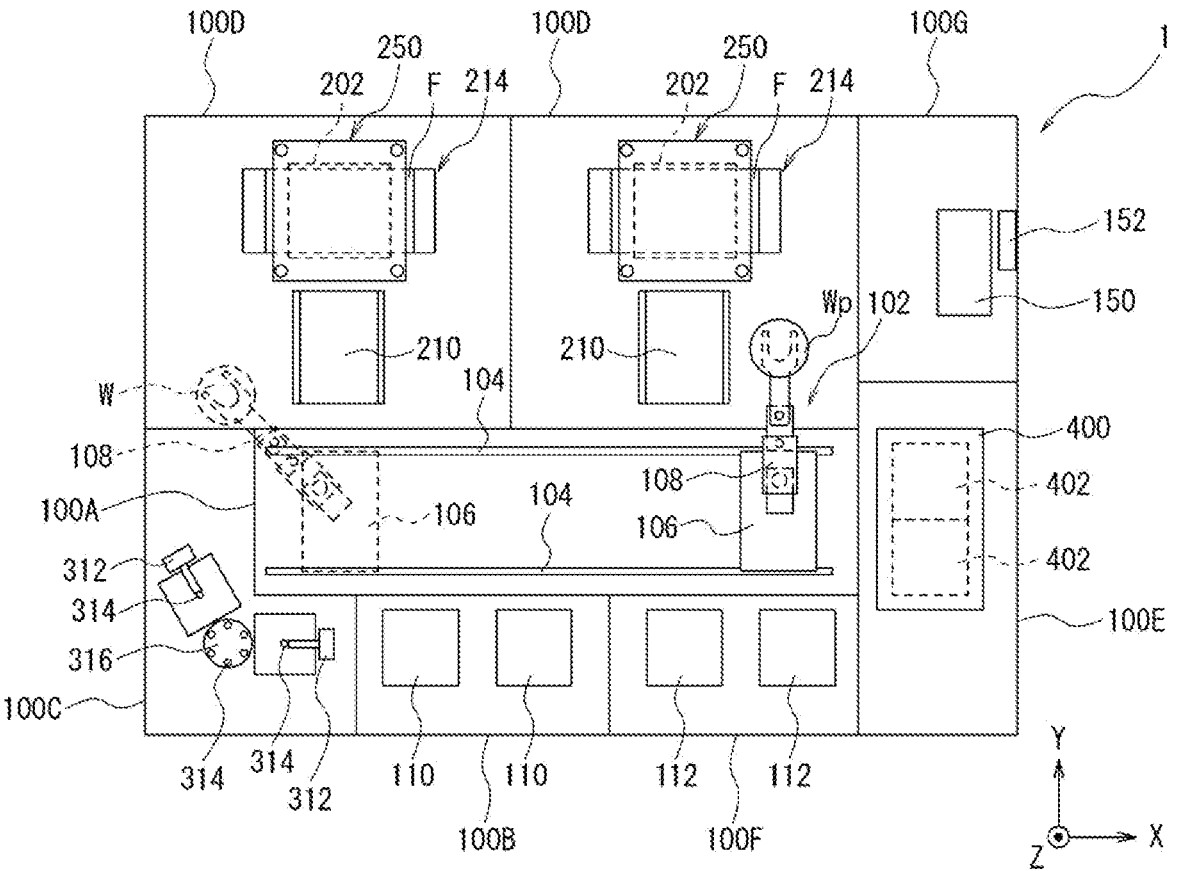
FIG. 1 is a plan view showing an example of the resin sealing apparatus according to an embodiment of the present invention.

Hereinafter, an embodiment of the present invention will be described in detail with reference to the drawings. FIG. 1 is a plan view (schematic view) showing an example of a resin sealing apparatus 1 according to this embodiment. For convenience, arrows in the drawing indicate the left-right direction (X direction), the front-rear direction (Y direction), and the up-down direction (Z direction) of the resin sealing apparatus 1. Further, in all the drawings for illustrating each embodiment, members having the same functions are denoted by the same reference numerals, and repeated description thereof may be omitted.

The resin sealing apparatus 1 according to this embodiment is an apparatus that uses a sealing mold 20 including an upper mold 204 and a lower mold 206 to seal a workpiece (molded product) W with resin. Hereinafter, as the resin sealing apparatus 1, a compression molding apparatus is illustrated as an example, which holds the workpiece W with the lower mold 206, covers a cavity 208 (partially including the mold surface) provided in the upper mold 204 with a release film (may be simply referred to as "film" hereinafter) F, and performs a clamping operation of the upper mold 204 and the lower mold 206 to resin-seal the workpiece W with resin. However, the present invention is not limited thereto.

First, the workpiece W to be molded has a configuration in which a plurality of electronic components Wb are mounted in a matrix on a base material Wa. More specifically, examples of the base material Wa may include plate-shaped members such as resin substrates, ceramic substrates, metal substrates, carrier plates, lead frames, and wafers formed in a rectangular shape, a circular shape, or the like. Further, examples of the electronic components Wb may include semiconductor chips, MEMS chips, passive elements, radiator plates, conductive members, and spacers. However, the present invention is not limited thereto.

Examples of the method for mounting the electronic components Wb on the base material Wa may include mounting methods such as wire bonding mounting and flip chip mounting. Alternatively, in the case of a configuration in which the base material (a carrier plate made of glass or metal) Wa is peeled off from the molded product Wp after resin sealing, there is also a method of attaching the electronic components Wb using an adhesive tape having heat peelability or ultraviolet curable resin that is cured by ultraviolet irradiation.

Further, as an example of the resin, liquid thermosetting resin (for example, filler-containing epoxy resin or the like) is used. In addition, the resin is not limited to the above-described state and may be in other states (shapes) such as granular (used as a generic term for granular, pulverized, powdery or the like), plate-like, and sheet-like, or resin other than epoxy-based thermosetting resin may be used.

Further, as an example of the film F, a film material excellent in heat resistance, peelability, flexibility, and extensibility, such as PTFE (polytetrafluoroethylene), ETFE (polytetrafluoroethylene polymer), PET, FEP, fluorine-impregnated glass cloth, polypropylene, and polyvinylidine chloride are preferably used. In this embodiment, a roll-shaped film is used as the film F. As another example, a strip-shaped film may be used (not shown).

Next, an overview of the resin sealing apparatus 1 according to this embodiment will be described. As shown in FIG. 1, the resin sealing apparatus 1 includes a transport unit 100A that mainly transports the workpiece W and the molded product Wp, a workpiece supply unit 100B that mainly supplies the workpiece W, a resin supply unit 100C that mainly supplies resin, a press unit 100D that mainly seals the workpiece W with resin and processes it into the molded product Wp, a post-curing unit 100E that mainly performs post-curing of the molded product Wp after resin sealing, a molded product storage unit 100F that mainly stores the molded product Wp after post-curing, and a controller 100G that mainly controls each mechanism and each process as a main configuration.

In this embodiment, the transport unit 100A is arranged in the center of the apparatus, and the units are arranged so as to surround the transport unit 100A. Specifically, the workpiece supply unit 100B, the resin supply unit 100C, and the molded product storage unit 100F are arranged on the front side of the transport unit 100A. The press unit 100D is arranged on the rear side of the transport unit 100A. Further, the post-curing unit 100E is arranged on the right and front right sides of the transport unit 100A. The controller 100G is arranged on the rear right side of the transport unit 100A. However, the present invention is not limited thereto.

The resin sealing apparatus 1 can change the overall configuration mode by changing the configuration of the units. For example, the configuration shown in FIG. 1 is an example in which two press units 100D are arranged, but a configuration in which only one or three or more press units 100D are arranged is also possible. Also, a configuration or the like in which other units are additionally arranged is possible (neither of which is shown).

Transport Unit

First, the transport unit 100A included in the resin sealing apparatus 1 will be described.

The transport unit 100A includes a transport device 102 that transports the workpiece W and the molded product Wp. As an example, the transport device 102 includes a guide rail 104, a base portion 106 that reciprocates along the guide rail 104 in a predetermined direction (as an example, the left-right direction), and a holding and moving mechanism 108 (as an example, an articulated robot) that is fixed to the base portion 106 and holds and moves the workpiece W and the molded product Wp. Thus, it is possible to hold the workpiece W and the molded product Wp, and transport them between the units and into and out of each mechanism.

Workpiece Supply Unit

Next, the workpiece supply unit 100B included in the resin sealing apparatus 1 will be described.

The workpiece supply unit 100B includes a workpiece stocker 110 used for storing the workpiece W. As an example, the workpiece stocker 110 uses a known stack magazine, slit magazine or the like, and can store a plurality of workpieces W collectively. The plurality of workpieces W are transported out one by one by the holding and moving mechanism 108.

Resin Supply Unit

Next, the resin supply unit 100C included in the resin sealing apparatus 1 will be described. In the resin supply unit 100C, resin is supplied (placed) to the workpiece W transported in from the workpiece supply unit 100B by the transport device 102.

The resin supply unit 100C includes a pair of dispensers 312 that discharge and supply the resin (here, liquid resin) in a syringe 314 onto the workpiece W, and a revolver-type syringe supply unit 316 that rotatably holds a plurality of replacement syringes 314 between the pair of dispensers 312. Each dispenser 312 is configured to discharge resin while sequentially receiving replacement syringes 314 from the shared syringe supply unit 316.

Press Unit

Next, the press unit 100D included in the resin sealing apparatus 1 will be described. In this press unit 100D, resin sealing is performed on the workpiece W (with resin placed thereon) transported in from the resin supply unit 100C by the transport device 102.

The press unit 100D includes a sealing mold 202 having a pair of molds to be opened and closed (for example, molds formed by assembling a plurality of mold blocks, mold plates, mold pillars, etc. made of alloy tool steel and other members). A press device 250 is also provided for driving the sealing mold 202 to open and close to seal the workpiece W with resin. Further, a transport loader 210 is provided for transporting the workpiece W and the molded product Wp into and out of the sealing mold 202 (however, it is also possible to adopt a configuration in which the workpiece W and the molded product Wp are directly transported in and out by the above-described holding and moving mechanism 108 without providing the transport loader 210).

Figure 2:
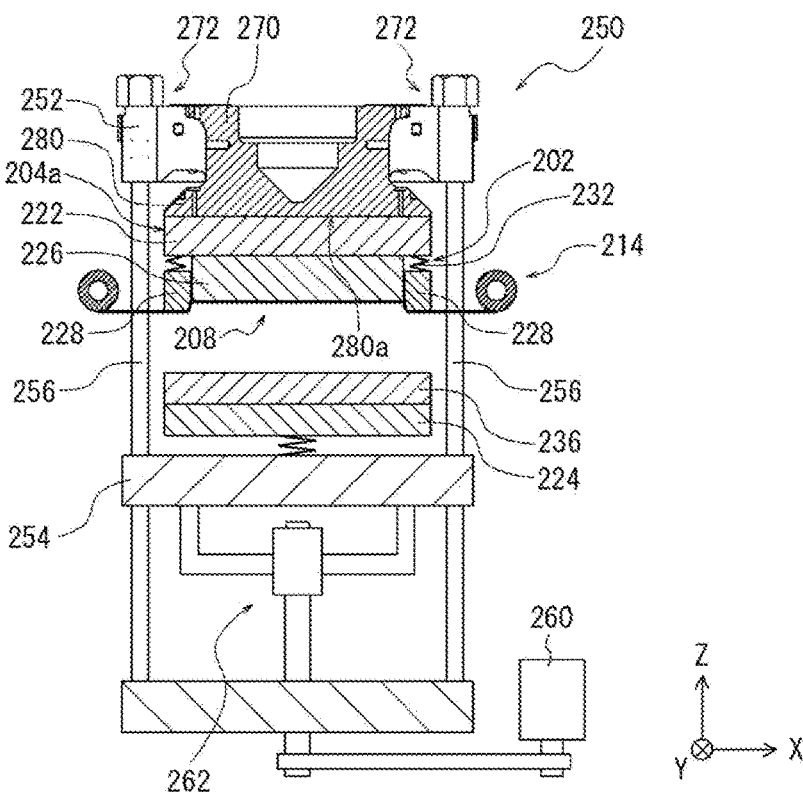
FIG. 2 is a front cross-sectional view showing an example of the press device of the resin sealing apparatus of FIG. 1.

Here, as shown in FIG. 2, the press device 250 includes a pair of platens 252 and 254, a plurality of tie bars 256 on which the pair of platens 252 and 254 are installed, and a drive device for moving (lifting and lowering) the platen 254. Specifically, the drive device includes a drive source (for example, an electric motor) 260 and a drive transmission mechanism (for example, a ball screw or toggle link mechanism) 262 (but not limited thereto). In this embodiment, the platen 252 on the upper side in the vertical direction is set as a fixed platen (a platen fixed to tie bars 256), and the platen 254 on the lower side is set as a movable platen (a platen that is slidably held by the tie bar 256 to be lifted and lowered). However, the present invention is not limited thereto, and the press device 250 may be set upside down, that is, the upper side may be the movable platen and the lower side may be the fixed platen, or both the upper side and the lower side may be set as movable platens (both not shown).

Furthermore, the sealing mold 202 includes one mold (upper mold 204) on the upper side and the other mold (lower mold 206) on the lower side in the vertical direction as a pair of molds arranged between the pair of platens 252 and 254 in the press device 250. The upper mold 204 and the lower mold 206 move toward and away from each other to close and open the molds (that is, the vertical direction (up-down direction) is the mold opening and closing direction). In this embodiment, the upper mold 204 is assembled to the upper platen (in this case, the fixed platen 252), and the lower mold 206 is assembled to the lower platen (in this case, the movable platen 254).

Further, in this embodiment, as an example, a film supply mechanism 214 is provided for transporting (supplying) the roll-shaped film F into the sealing mold 202.

Figure 3:
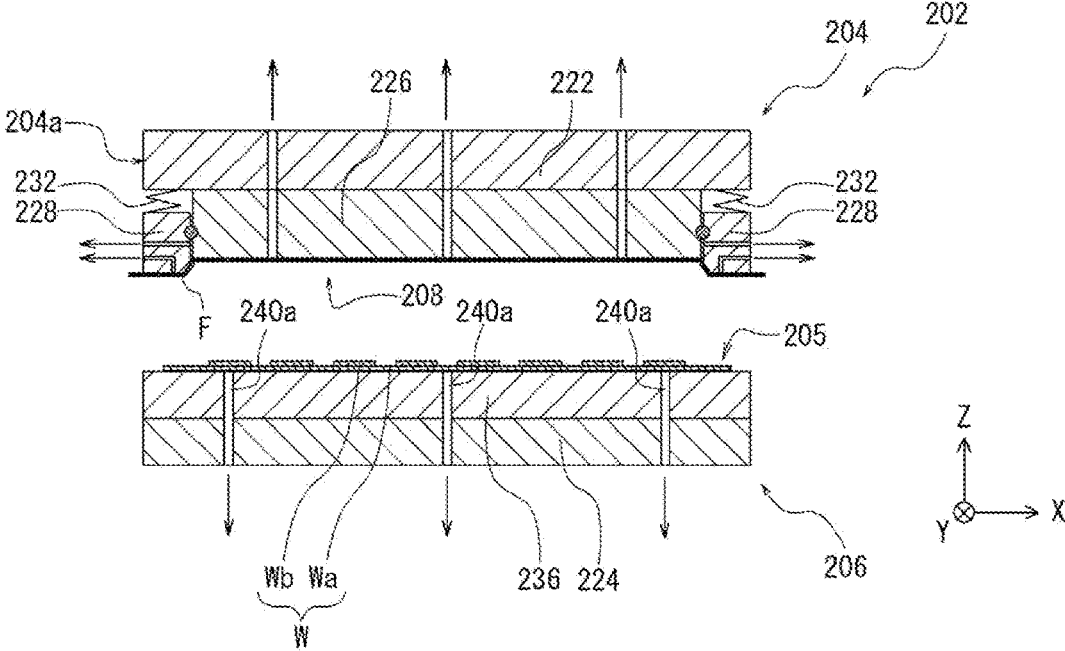
FIG. 3 is a front cross-sectional view showing an example of the sealing mold of the resin sealing apparatus of FIG. 1.

Next, the upper mold 204 of the sealing mold 202 will be described. As shown in FIG. 3, the upper mold 204 includes an upper plate 222, a cavity piece 226, a clamper 228, etc., which are assembled together. In this embodiment, a cavity 208 is provided on the lower surface of the upper mold 204 (the surface on the side of the lower mold 206).

More specifically, the cavity piece 226 is fixedly attached to the lower surface of the upper plate 222. Further, the clamper 228 is configured in an annular shape so as to surround the cavity piece 226, and is attached to the lower surface of the upper plate 222 via a biasing member 232 so as to be separated (floating) and vertically movable. The cavity piece 226 forms the inner portion (bottom portion) of the cavity 208, and the clamper 228 forms the side portion of the cavity 208. In addition, in this embodiment, one cavity 208 is provided in one upper mold 204. However, the present invention is not limited to this configuration, and a configuration in which a plurality of cavities are arranged side by side in the left-right direction (or in the front-rear direction) may be used.

Further, in this embodiment, an upper mold heating mechanism (for example, an electric heating wire heater or the like) is provided for heating the upper mold 204 to a predetermined temperature (for example, 100° C. to 200° C.).

Next, the lower mold 206 of the sealing mold 202 will be described. As shown in FIG. 3, the lower mold 206 includes a lower plate 224, a holding plate 236, etc., which are assembled together. Here, the holding plate 236 is fixedly attached to the upper surface of the lower plate 224 (the surface on the side of the upper mold 204).

Further, in this embodiment, a workpiece holding portion 205 is provided to hold the workpiece W at a predetermined position on the lower surface of the holding plate 236. As an example, the workpiece holding portion 205 communicates with a suction device (not shown) via a suction path 240a arranged through the holding plate 236 and the lower plate 224. It is also possible to use a configuration in which holding claws for holding the outer periphery of the work-piece W are provided in parallel with the configuration including the suction path 240a (not shown).

In this embodiment, corresponding to the configuration of the upper mold 204 (configuration in which one cavity 208 is provided), one lower mold 206 is provided with one workpiece holding portion 205, and the workpiece W is sealed with resin one by one. However, the present invention is not limited thereto.

Further, in this embodiment, a lower mold heating mechanism (for example, an electric heating wire heater or the like) is provided for heating the lower mold 206 to a predetermined temperature (for example, 100° C. to 200° C.).

Figure 4:
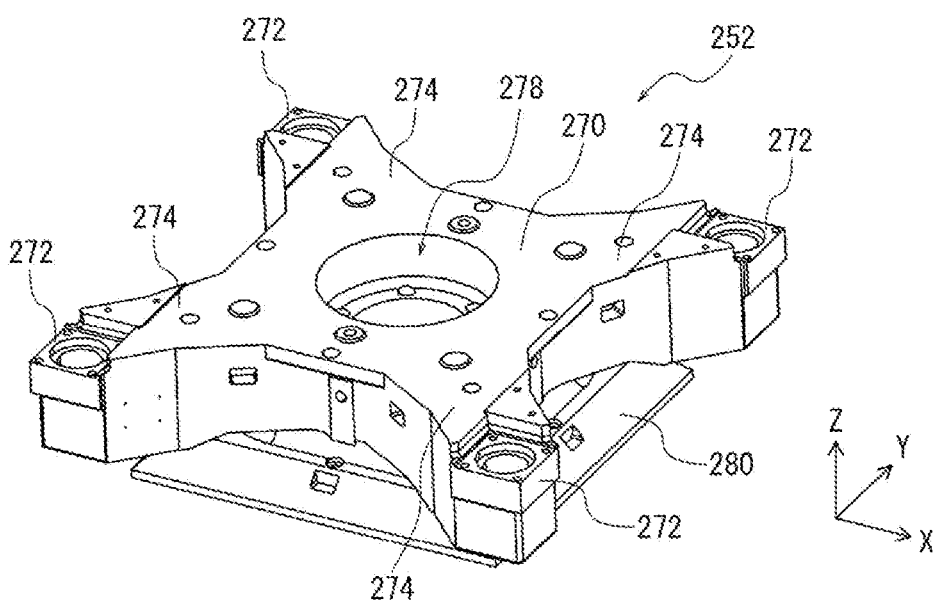
FIG. 4 is a perspective view showing an example of the fixed platen of the resin sealing apparatus of FIG. 1.
Figure 5:
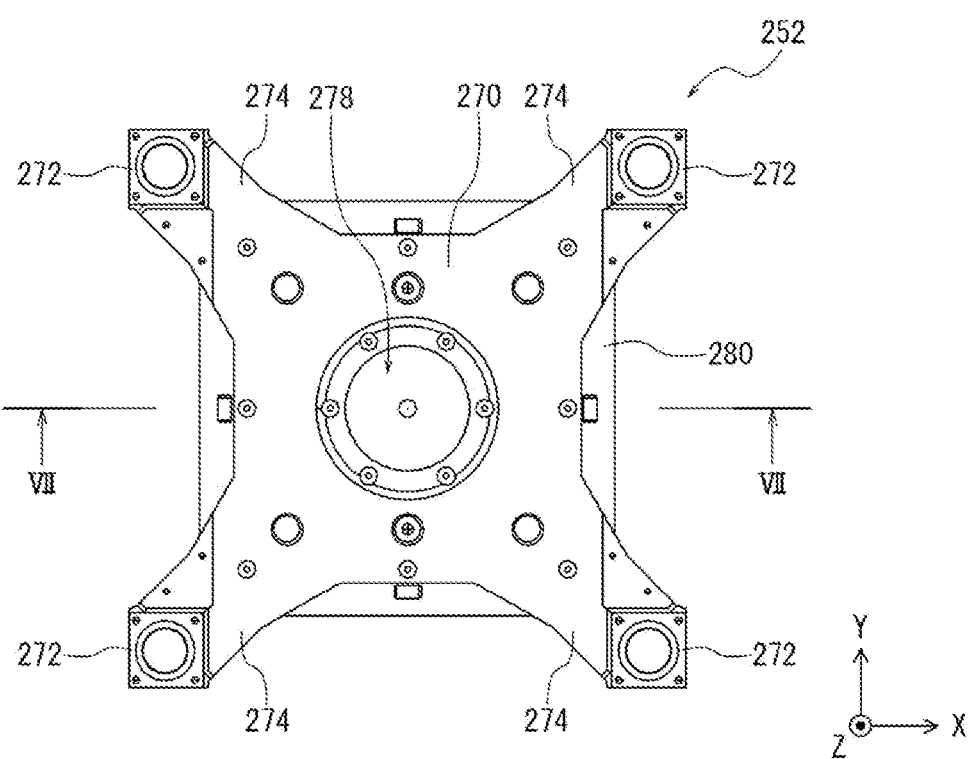
FIG. 5 is a plan view showing an example of the fixed platen of FIG. 4.
Figure 6:
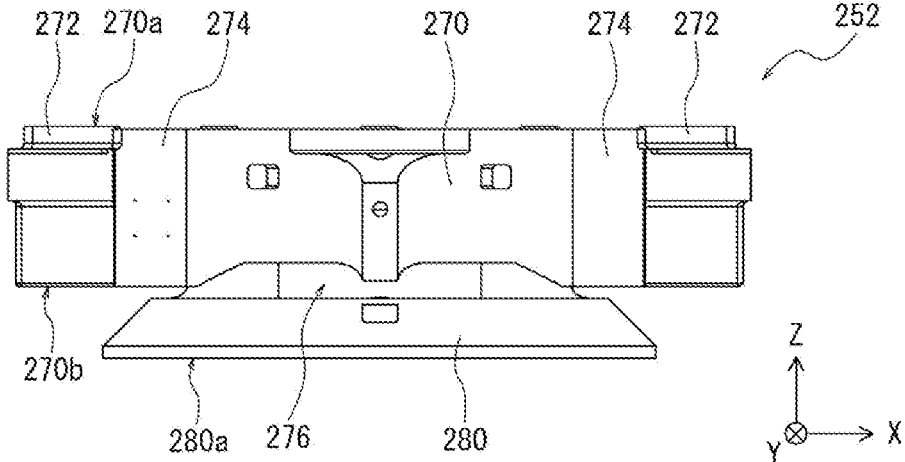
FIG. 6 is a front view showing an example of the fixed platen of FIG. 4.
Figure 7:
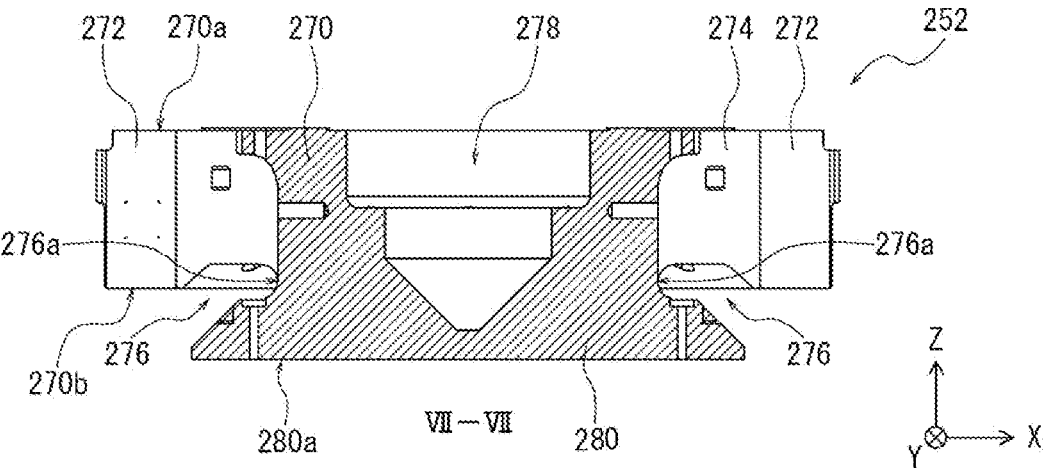
FIG. 7 is a cross-sectional view taken along the line VII-VII in FIG. 4.

Next, the fixed platen 252 of the press device 250, which is characteristic of this embodiment, will be described in detail. Here, FIG. 2 shows a front cross-sectional view (schematic view) of the press device 250 of the resin sealing apparatus 1. FIG. 3 shows a front cross-sectional view (schematic view) of the sealing mold 202 of the resin sealing apparatus 1. Here, a perspective view (schematic view) of the fixed platen 252 is shown in FIG. 4, a plan view is shown in FIG. 5, and a front view is shown in FIG. 6. FIG. 7 is a cross-sectional view taken along the line VII-VII in FIG. 4.

The fixed platen 252 according to this embodiment includes a main body portion 270 and a bell-shaped portion 280 (in this embodiment, the main body portion 270 and the bell-shaped portion 280 are integrally formed as will be described later). As an example, a fixed portion 272 fixed to the tie bar 256 is provided on the main body portion 270 on the side of the first surface 270a. In addition, the bell-shaped portion 280 is provided on the side of the second surface 270b that is opposite in the up-down direction to the first surface 270a, and one of the upper mold 204 and the lower mold 206 (the upper mold 204 in this embodiment) is fixed to the bell-shaped portion 280.

Here, the bell-shaped portion 280 is formed in a shape that widens toward the end (that is, along the direction from the first surface 270a toward the second surface 270b) (a shape in which the outer diameter gradually increases) as it is separated from the main body portion 270, and the surface opposite to the first surface 270a of the main body portion 270 in the up-down direction serves as a mold fixing surface 280a. The configuration including the bell-shaped portion 280 has the effect of preventing the flatness of the mold fixing surface 280a from decreasing at the time of mold closing (that is, when pressure is applied).

As a more specific configuration, the fixed portion 272 is provided at the tip portion of an arm portion 274 extended radially at four corners of the main body portion 270. The arm portion 274 is configured as a "bending generating portion" that generates relatively greater bending than other portions by setting stress to be concentrated when the mold is closed. According to this, by positively deforming (bending) the arm portion 274 when the mold closing force is applied, it is possible to prevent deformation of the bell-shaped portion 280, particularly the mold fixing surface 280a. Thus, it is possible to suppress deformation of the mold fixing surface 280a without using the conventional rigidity enhancement method of increasing the thickness of the fixed platen 252 at the central position in the radial direction.

In addition, the fixed platen 252 is provided with a circumferential recessed portion 276 (specifically, formed in an annular shape along the outer peripheral shape of the upper mold 204 fixed to the fixed platen 252) that is bored toward the center in the radial direction between the main body portion 270 and the bell-shaped portion 280. According to this, the effect of keeping the mold fixing surface 280a flat (that is, the effect of preventing the flatness of the mold fixing surface 280a from decreasing (deteriorating)) can be obtained. According to the research and verification conducted by the inventors of the present application, the reason is that, by providing the recessed portion 276, the balance between the amount of deformation in the bell-shaped portion 280 near the center in the radial direction and the amount of deformation near the outer periphery in the radial direction is maintained, that is, the effect of preventing the difference in the amount of deformation from occurring can be obtained.

Here, the recessed portion 276 is formed so that an innermost portion 276a in the radial direction is located closer to the center in the radial direction than the outer peripheral portion 204a of one mold (the upper mold 204 in this embodiment) fixed to the fixed platen 252 in both the left-right direction and the front-rear direction. In experiments and simulations conducted by the inventors of the present application, it was confirmed that, by providing the shape, the effect of keeping the mold fixing surface 280a flat (that is, the effect of preventing the flatness of the mold fixing surface 280a from decreasing (deteriorating)) is further enhanced.

Further, in this embodiment, the main body portion 270 and the bell-shaped portion 280 are integrally formed by casting, and are provided with a central hole 278 bored in the direction from the first surface 270a toward the second surface 270b at the central position in the radial direction. Here, the central hole 278 is formed so that the inner diameter decreases stepwise or tapered in the direction from the first surface 270a toward the second surface 270b. According to this, the mold closing force acting on the bell-shaped portion 280 via the sealing mold (upper mold 204) can be directed toward the arm portion 274. That is, the stress can be concentrated on the arm portion 274. Further, it is possible to reduce the weight of the fixed platen 252 (it was confirmed that the weight can be reduced by about 30% compared to the comparative example). Furthermore, integral formation by casting becomes possible, which makes it possible to improve production efficiency and reduce production costs.

Here, the depth of the central hole 278 is appropriately set, and as an example, it has a shape extending to the bell-shaped portion 280 in the up-down direction. However, the shape is not limited thereto, and may be a shape extending to the recessed portion 276, a shape formed only in the main body portion 270, or the like (none of which is shown). In this embodiment, the central hole 278 is formed so as not to penetrate to the mold fixing surface 280a of the bell-shaped portion 280. According to this, the effect of keeping the mold fixing surface 280a flat, that is, the effect of preventing the flatness of the mold fixing surface 280a from decreasing (deteriorating), can be further enhanced.

As described above, as the press device 250 according to this embodiment, a case where the sealing mold 202 (configuration having a cavity in the upper mold 204) for a resin sealing apparatus based on a compression molding method is attached has been described as an example, but the present invention is not limited thereto. The present invention can also be applied to a sealing mold (configuration having a cavity in the lower mold 206) for a resin sealing apparatus based on a compression molding method, a sealing mold for resin sealing based on a transfer molding method, etc. (none of which is shown).

Post-curing Unit

Next, the post-curing unit 100E included in the resin sealing apparatus 1 will be described. In this post-curing unit 100E, post-curing is performed on the molded product Wp transported in from the press unit 100D by the transport device 102.

The post-curing unit 100E includes one or a plurality of ovens (post-curing ovens) 400 having a plurality of heating chambers 402 for holding the molded product Wp transported in by the transport device 102 inside and performing post-curing by heating the molded product Wp at a set temperature. A configuration without the post-curing unit 100E may be used (not shown).

Molded Product Storage Unit

Next, the molded product storage unit 100F included in the resin sealing apparatus 1 will be described. In this molded product storage unit 100F, the molded product Wp transported in from the post-curing unit 100E by the transport device 102 is stored.

The molded product storage unit 100F includes a molded product stocker 112 used for storing the molded product Wp. As an example, the molded product stocker 112 uses a known stack magazine, slit magazine, or the like, and can collectively store a plurality of molded products Wp. The plurality of molded products Wp are transported in one by one by the holding and moving mechanism 108.

Controller

Next, the controller 100G included in the resin sealing apparatus 1 will be described. The controller 100G includes an operation part 152 for an operator to input operating conditions of the resin sealing apparatus 1, and a control part 150 for controlling the operation of each mechanism in the resin sealing apparatus 1 according to the operating conditions input by the operator and the operating conditions stored in advance. The operation part 152 is not limited to being arranged inside the controller 100G, and may be arranged inside another unit or at a position adjacent thereto.

Resin Sealing Operation

Next, an outline of the operation of performing resin sealing (that is, resin sealing method) using the resin sealing apparatus 1 according to this embodiment will be described. Here, a configuration in which one upper mold 204 is provided with a set of cavities 208 and one lower mold 206 is provided with one workpiece W for resin sealing to obtain one molded product Wp will be given as an example. However, the present invention is not limited thereto, and a configuration in which a plurality of workpieces W are collectively sealed with resin may be used.

As a preparation process, a heating process (upper mold heating process) of adjusting and heating the upper mold 204 to a predetermined temperature (for example, 100° C. to 200° C.) is performed by the upper mold heating mechanism. Further, a heating process (lower mold heating process) of adjusting and heating the lower mold 206 to a predetermined temperature (for example, 100° C. to 200° C.) is performed by the lower mold heating mechanism. In addition, a process (film supply process) of transporting (sending out) the film F and supplying the film F to a predetermined position (a position between the upper mold 204 and the lower mold 206) in the sealing mold 202 is performed by the film supply mechanism 214.

Next, a process of transporting the workpieces W one by one out of the workpiece stocker 110 and transporting them to the resin supply unit 100C is performed by the transport device 102.

Next, a process of transporting the workpiece W to be positioned directly below the syringe 314 of the dispenser 312, and supplying (discharging) and placing a specified amount of resin from the syringe 314 onto the upper surface of the workpiece W is performed by the transport device 102. A process of supplying (transporting) resin directly into the sealing mold 202 (specifically, into the cavity 208, etc.) may be performed.

Next, a process of transporting the workpiece W (with the resin placed on the upper surface) to the press unit 100D and transferring it to the transport loader 210 is performed by the transport device 102.

Next, a process of transporting the workpiece W into the sealing mold 202 is performed by the transport loader 210. A preliminary heating process for the workpiece W may be performed before the workpiece W is transported into (transported in) the sealing mold 202.

Next, the sealing mold 202 is closed (mold clamping), and a process of clamping the workpiece W with the upper mold 204 and the lower mold 206 to seal it with resin (resin sealing process) is performed. Specifically, the drive device (drive source 260, drive transmission mechanism 262, etc.) of the press device 250 is driven, and the movable platen 254 is moved (pushed) toward the fixed platen 252 to apply a mold closing force (pressurizing force) to the sealing mold 202. As a result, the cavity piece 226 is relatively lowered in the cavity 208 of the upper mold 204 to heat and press the resin against the workpiece W held by the lower mold 206.

In this manner, the resin is thermally cured and resin sealing (compression molding) is performed to form the molded product Wp.

Next, the sealing mold 202 is opened, and a process of taking out the molded product Wp from the sealing mold 202 is performed by the transport loader 210.

Next, a process of receiving the molded product Wp from the transport loader 210 and transporting it to the post-curing unit 100E is performed by the transport device 102.

In parallel with (or after) this, a process of transporting (sending out) the film F to transport the used film F out of the sealing mold 202 is performed by the film supply mechanism 214.

Next, the molded product Wp is transported into a pre-determined oven 400 by the transport device 102, and a process (post-curing process) of performing post-curing (post-molding heating) is performed. The post-curing process may be omitted.

After the post-curing process is performed, a process of transporting out the molded product Wp from the heating chamber 402 of the oven 400 and transporting it to the molded product storage unit 100F is performed by the transport device 102. Next, a process of transporting the molded products Wp into the molded product stocker 112 one by one is performed by the transport device 102.

The above are the main processes of the resin sealing method performed using the resin sealing apparatus 1. However, the above order of processes is only an example, and it is possible to change the order of the processes or perform them in parallel as long as there is no problem. For example, in this embodiment, since the configuration includes two press units 100D, it is possible to perform the above operations in parallel to efficiently form molded products.

As described above, according to the resin sealing apparatus of the present invention, it is possible to solve the contradictory problems of preventing deformation of the mold fixing surface of the fixed platen in the press device and reducing the unit weight of the fixed platen.

It should be noted that the present invention is not limited to the above-described embodiments, and can be modified in various ways without departing from the scope of the present invention. In particular, although the above illustrates a configuration in which the platen on the upper side in the vertical direction is the fixed platen as an example, the present invention is not limited thereto and can also be applied to a configuration in which the platen on the lower side in the vertical direction is the fixed platen.

Furthermore, although the above embodiments illustrate a compression molding apparatus having the cavity in the upper mold as an example, the present invention can also be applied to a compression molding apparatus having the cavity in the lower mold. The present invention can also be applied to a resin sealing apparatus based on a transfer molding method.

What is claimed is:

1. A resin sealing apparatus for sealing a workpiece with resin and processing the workpiece into a molded product using a sealing mold which comprises an upper mold and a lower mold, the resin sealing apparatus comprising:
   a press device closing and opening the upper mold and the lower mold,
   wherein the press device comprises:
      a fixed platen to which one of the upper mold and the lower mold is fixed,
      a movable platen to which the other one of the upper mold and the lower mold is fixed, a tie bar fixing the fixed platen and holding the movable platen so that the movable platen is able to be lifted and lowered, and
      a drive device lifting and lowering the movable platen,
   wherein the fixed platen comprises:
      a main body portion, having a first surface and a second surface opposite to the first surface;
      a fixed portion, fixed to the tie bar on a side of the first surface of the main body portion; and
      a bell-shaped portion, disposed on a side of the second surface, wherein one of the upper mold and the lower mold is fixed to the bell-shaped portion,
   wherein the main body portion and the bell-shaped portion are integrally formed by casting, and the main body portion and the bell-shaped portion are provided with a central hole bored in a direction from the first surface toward the second surface, at a central position in a radial direction, and
   the central hole is formed with an inner diameter decreasing stepwise or tapered in a direction from the first surface toward the second surface, wherein the central hole is formed so as not to penetrate to a mold fixing surface of the bell-shaped portion, wherein the fixed portion is provided at a tip portion of an arm portion extended radially at four corners of the main body portion, and the arm portion is configured as a bending generating portion that generates relatively greater bending than other portions by setting stress to be concentrated during mold closing.

2. The resin sealing apparatus according to claim 1, wherein a circumferential recessed portion, bored toward a center in a radial direction, is provided between the main body portion and the bell-shaped portion.

3. The resin sealing apparatus according to claim 2, wherein the circumferential recessed portion is formed so that an innermost portion in the radial direction is located closer to the center in the radial direction than an outer peripheral portion of one of the upper mold and the lower mold in both a left-right direction and a front-rear direction.

4. The resin sealing apparatus according to claim 2, wherein
   the circumferential recessed portion is formed in an annular shape along an outer peripheral shape of the upper mold fixed to the fixed platen.

5. The resin sealing apparatus according to claim 2, wherein
   a depth of the central hole is set such that the central hole has a shape extending to the circumferential recessed portion in an up-down direction.

6. The resin sealing apparatus according to claim 1, wherein
   the bell-shaped portion is formed in a shape that widens along a direction from the first surface toward the second surface, and
   the shape of the bell-shaped portion has an outer diameter gradually increases as the bell-shaped portion is separated from the main body portion.

7. The resin sealing apparatus according to claim 1, wherein
   the bell-shaped portion includes a surface opposite to the first surface of the main body portion in an up-down direction, and
   the surface of the bell-shaped portion is served as a mold fixing surface for one of the upper mold and the lower mold to be fixed.

8. The resin sealing apparatus according to claim 1, wherein a depth of the central hole is set such that the central hole has a shape extending to the bell-shaped portion in an up-down direction.

* * * * *